(12) United States Patent
Chatterjee et al.

(10) Patent No.: US 12,041,569 B2
(45) Date of Patent: Jul. 16, 2024

(54) TIME SYNCHRONIZATION ACCURACY ENHANCEMENTS

(71) Applicant: Apple Inc., Cupertino, CA (US)

(72) Inventors: Debdeep Chatterjee, San Jose, CA (US); Sergey Panteleev, Nizhny Novgorod (RU); Fatemeh Hamidi-Sepehr, Santa Clara, CA (US); Toufiqul Islam, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 17/286,578

(22) PCT Filed: Nov. 1, 2019

(86) PCT No.: PCT/US2019/059528
§ 371 (c)(1),
(2) Date: Apr. 19, 2021

(87) PCT Pub. No.: WO2020/093000
PCT Pub. Date: May 7, 2020

(65) Prior Publication Data
US 2021/0345272 A1    Nov. 4, 2021

Related U.S. Application Data

(60) Provisional application No. 62/755,349, filed on Nov. 2, 2018.

(51) Int. Cl.
*H04W 56/00* (2009.01)
*H04W 80/02* (2009.01)
*H04W 92/10* (2009.01)

(52) U.S. Cl.
CPC ..... *H04W 56/005* (2013.01); *H04W 56/0015* (2013.01); *H04W 80/02* (2013.01); *H04W 92/10* (2013.01)

(58) Field of Classification Search
CPC .......... H04W 56/005; H04W 56/0015; H04W 80/02; H04W 92/10
See application file for complete search history.

(56) References Cited

U.S. PATENT DOCUMENTS

2020/0229270 A1* 7/2020 Chatterjee ......... H04W 72/0446
2021/0377884 A1* 12/2021 Lee ....................... H04W 92/18

FOREIGN PATENT DOCUMENTS

| CN | 110958070 A | * | 4/2020 | ............ H04J 3/0667 |
| KR | 10-0403869 B1 | | 11/2003 | |

OTHER PUBLICATIONS

"How LTE Stuff Works?" Sep. 19, 2014 (Year: 2014).*

(Continued)

*Primary Examiner* — Jianye Wu
(74) *Attorney, Agent, or Firm* — Eschweiler & Potashnik, LLC

(57) ABSTRACT

A device of a New Radio (NR) User Equipment (UE), a system, a method and a machine-readable medium. The device includes a radio frequency (RF) interface, and a processing circuitry coupled to the RF interface, the processing circuitry to: decode a message from a NR Node B (gNodeB), the message corresponding to a unicast message or to a broadcast message and being received through a Universal Mobile Telecommunications System (UMTS) interface (Uu interface), the message further including reference time information; and determine a reference time from the reference time information, the reference time to be used by higher layers of the UE.

20 Claims, 3 Drawing Sheets

(56) References Cited

OTHER PUBLICATIONS

CN-110958070-A (English) (Year: 2020).*
PCT Search Report dated Apr. 8, 2020 in connection with PCT Application No. PCT/US2019/059528.
PCT Written Opinion dated Apr. 8, 2020 in connection with PCT Application No. PCT/US2019/059528.
Huawei et al., 'Discussion on solutions on transmission of time reference information', R2-1808381, 3GPP TSG-RAN WG2 #102, Busan, Korea, May 11, 2018 section 2.
Ericsson, 'Time synchronization', R1-1809414, 3GPP TSG-RAN WG1 Meeting #04, Gothenburg. Sweden, Aug. 11, 2018 Section 2.
3GPP; TSG RAN; NR; Physical layer procedures for control (Release 15), 3GPP TS 38.213 V15.3.0, Oct. 1, 2018 section 4.2.
Huawei, 'Discussion on the accurate reference timing', R2-1817274, 3GPP TSG-RAN WG2 Meeting #104, Spokane, USA, Nov. 1, 2018 section 2.2.1.

* cited by examiner

TIME SYNCHRONIZATION ACCURACY ENHANCEMENTS

CROSS REFERENCE TO RELATED APPLICATIONS

This application is a National Phase entry application of International Patent Application No. PCT/US2019/059528 filed Nov. 1, 2019, which claims the benefit of and priority from U.S. Provisional Patent Application No. 62/755,349 entitled "TIME SYNCHRONIZATION ACCURACY ENHANCEMENTS," filed Nov. 2, 2018, the entire disclosure of which is incorporated herein by reference.

FIELD

Various embodiments generally relate to the field of cellular communications, and particularly to the use of high-reliable low latency communications (HRLLCs).

BACKGROUND

Current Third Generation Partnership Project (3GPP) New Radio (NR) specifications (or 5G specifications) do not specifically address issues related to setting target timing error budgets for high-reliable low latency communications (HRLLCs) based on use cases.

DETAILED DESCRIPTION

Figure 1:
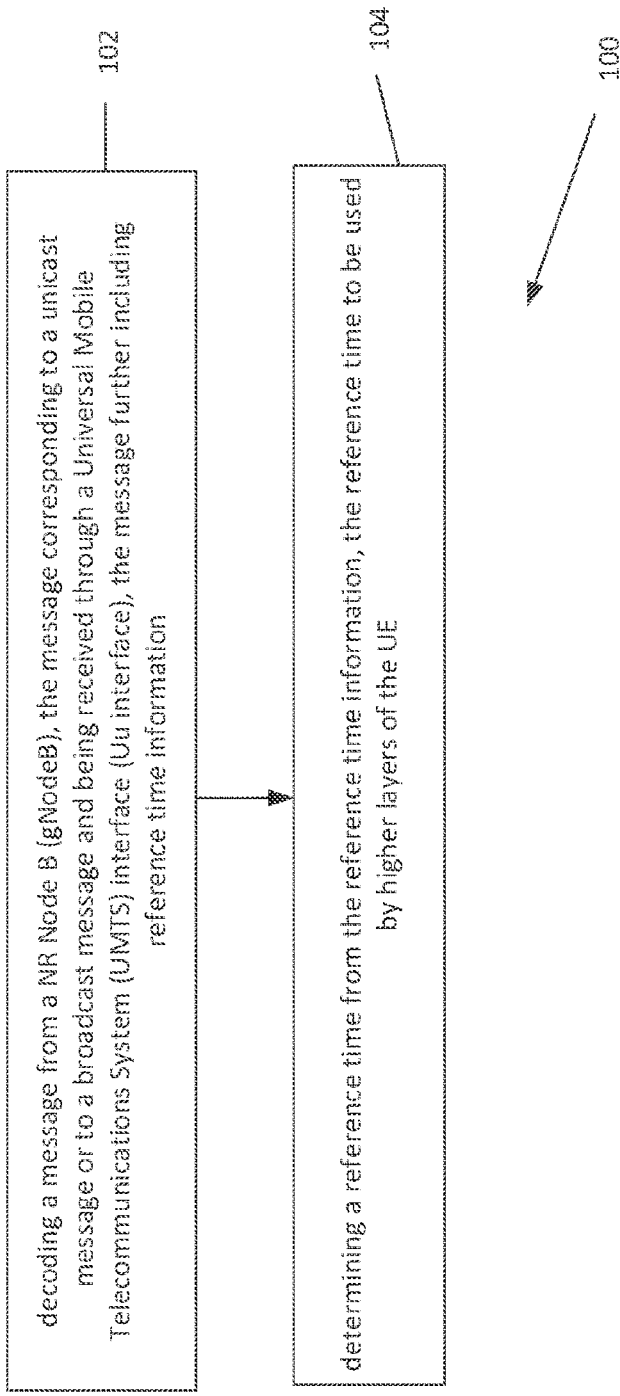
FIG. 1 illustrates a process according to some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B). An architecture includes, but is not limited to, a network topology. Examples of an architecture include, but is not limited to, a network, a network topology, and a system. Examples of a network include, but is not limited to, a time sensitive network (TSN), a core network (CN), any other suitable network known in the field of wireless communications, or any combination thereof.

Some embodiments described herein are related to one or more third generation partnership project (3GPP) specifications. Examples of these specifications include, but are not limited to, one or more 3GPP new radio (NR) specifications and one or more specifications directed and/or related to Radio Layer 1 (RAN1), Radio Layer 2 (RAN2), and/or fifth generation (5G) mobile networks/systems.

INTRODUCTION

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich content and services.

The first release on NR (5G) specification has been completed. It provides a baseline set of features and components for future cellular communication systems. It also supports the aspects of ultra-reliable low-latency communication (URLLC) by means of flexible resource allocation, scheduling and hybrid automatic repeat request (HARQ), low spectrum efficiency transmission parameters, etc. In Release 16, the baseline URLLC functionality is going to be enhanced, where one of the design directions is to further improve the time synchronization accuracy over a Universal Mobile Telecommunications System (UMTS) air interface (UU interface) which links UEs to the UMTS Terrestrial Radio Access Network, Unix-to-Unix. An improvement of the time synchronization is desirable considering the synchronicity requirements of use cases such as time sensitive networks (TSNs) as mentioned in Technical Report (TR) 22.804 V16.1.0.

Rel-15's Long Term Evolution (LTE) high-reliable low latency communication (HRLLC), a mechanism is defined to provide time reference information with a 0.25 µs granularity, either through system information block 16 (SIB16) or through UE-specific signaling such as radio resource control (RRC) signaling, where a common time reference structure (timeReferenceInfo IE) is used within both unicast and broadcast messages. Accuracy of the indicated time reference can also be signaled to the user equipment (UE) according to the latter scheme.

The time reference indication does not account for and compensate the radio frequency (RF) propagation delay, as specified in Rel-15 HRLLC. This implies that, in order to achieve suitable timing reference accuracy, the UE may need to adjust for the propagation delay. For instance, the UE could compensate the propagation delay through the timing advance (TA) command received from the network, and here, the performance would depend on how well the network can estimate the uplink transmission timing.

A similar approach to the Rel-15 HRLLC synchronization mechanism may be extended to NR to fulfill the target accuracy. While for NR Release 16 (Rel-16), the inaccuracy indication can still be used as introduced in Rel-15 HRLLC, it may be possible to reduce the granularity of the time reference indication. Such an enhancement can straightforwardly reduce the contribution of errors from the signaling mechanism itself. At the same time, considering System Information Block (SIB) or dedicated radio resource control (RRC) signaling as the containers, the overall impact to the network may not be significant to support this feature.

Since different factors contribute to the overall synchronization error budget to meet the desired target accuracy for different use cases, e.g. 1 μs mentioned in TR 22.804 V16.1.0 for TSN, it may be prudent to consider each of these factors for potential enhancements.

Embodiments described herein are directed to techniques (e.g., methods, apparatuses, devices, systems, etc.) of enhancing the time synchronization accuracy over a Uu interface. A Uu interface corresponds to the interface between a User Equipment (UE) and a Node B, such as a NR Node B (gNodeB)). Such embodiments can assist with providing improvements to the synchronization mechanism defined in Rel-15 HRLLC, as well as enhancements to other factors impacting the overall synchronization accuracy. Furthermore, some embodiments described herein are directed to techniques of handling the prioritizing and overwriting of rules to enable the synchronization-related indications through unicast and broadcast signaling.

Synchronization Signaling-Related Aspects and the Associated Enhancements

Priority/Overwriting Rules

In general, a UE in RRC_CONNECTED mode needs to keep up-to-date the system information block (SIB) information. When the network is able to provide the time reference via both unicast and broadcast signaling, some priorities/rules are needed to avoid mismatches or confusions at the UE side (e.g. whether the unicast time reference information overwrites the broadcasted one, etc.).

In one embodiment, the unicast signaling for indication of synchronization-related information (e.g, the reference time, the corresponding accuracy, etc.), i.e., via UE-specific RRC signaling, has higher priority than the broadcast synchronization signaling (e.g., via SIB16). This means that the unicast signaling overwrites the synchronization information already indicated by the broadcast signaling.

With the over-writing-based approach as mentioned, some UE behavior needs to also be defined. In one example, a UE (e.g., such as UE 201a or UE 201b of FIG. 2) expects to receive a subsequent timing reference via dedicated RRC, whenever a timing reference via broadcast signaling is received. In other words, the UE expects the network (e.g., CN 222 of FIG. 2) to always send an update via dedicated RRC message to the UE every time an update is broadcasted via SIB signaling, etc.

In another example, if a UE (e.g., such as UE 201a or UE 201b of FIG. 2) does not receive a subsequent timing reference via dedicated RRC within a window after a timing reference via broadcast signaling is received, then the UE only relies on the broadcasted synchronization information. Such a window may have a configured or predefined duration.

In yet another example, the time reference information is expected to be the same via both unicast and broadcast mechanisms.

Pre-Compensation of the Propagation Delay at the gNodeB Transmitter

Enhancements to the signaling framework in HRLLC can also be considered for Rel-16 NR.

In one embodiment, in some cases, the network estimates and (pre-)compensates for the propagation delay on a per-UE basis and uses the UE-specific signaling to indicate the time reference (which accounts for the propagation delay) and/or fine tune the indicated time reference. For such cases, the granularity of time reference indication may be also reduced from 0.25 μs. In a further embodiment, to facilitate fine-tuning of time reference indication, the unicast indicated timing granularity may be considered different from that of the SIB indication.

In another embodiment, when the UE-specific signaling is used to indicate a more accurate time reference (potentially with finer granularity as well), then such signaling has higher priority of the broadcast indication.

In one example, a new flag is specified to indicate to the UE whether or not the DL propagation delay has been compensated by the network and accounted for in the signaled time reference.

In an extended example, if such new flag is introduced, the network does not indicate the inaccuracy associated to the time reference.

As an alternative to a differentiation flag, a field with UE-specific compensation offset for the indicated time reference may be introduced. In this case, the original timing reference is still provided without compensation while the compensated part is signalled separately. This compensated part may also be applicable to both broadcast signaling of time reference and UE-specific time reference information.

In another example, whether or not to perform any compensation using timing advance (TA) information in a UE specific manner is also indicated to UE as part of the broadcast or dedicated (UE-specific) RRC signaling.

By not relying on estimation of propagation delay at the UE side, an approach involving pre-compensation as explained above also avoids the error components in the estimation of the propagation delay due to timing advance (TA) indication error, downlink (DL) reference timing error, and DL frame alignment error. In particular, when using pre-compensation as explained above in the context of some embodiments, there would advantageously be no impact from TA command granularity or from Te in propagation delay estimation), at the UE side.

Finer Granularity of Timing Advance Signaling

If the network does not pre-compensate for the propagation delay when providing the timing reference (e.g., as specified for Rel-15 HRLLC), it is likely that the onus of such compensation is on the UE to achieve suitable timing reference accuracy, e.g., based on TA. Otherwise, the target timing accuracy (especially for tighter requirements in NR Rel-16 TSN), may not be met. Still, such TA-based compensation may not always satisfy the synchronicity requirements for TSN (e.g., less than 1 μs).

Similar to the case of time reference information, decreasing the TA granularity can also help reduce the contribution to the synchronization error as part of enabling a more accurate estimation of the TA value at the UE. Considering the very tight synchronization accuracy requirements, such enhancements can be considered at least for smaller subcarrier spacing (SCS) choices.

According to sub clause 4.2 of 3GPP TS 38.213 V15.3.0:

"The timing adjustment indication [11, TS 38.321] indicates an initial time alignment value $N_{TA}$ used for a TAG. For a subcarrier spacing of $2^\mu \cdot 15$ kHz, the timing advance command for a TAG indicates the change of the uplink timing relative to the current uplink timing for the TAG in multiples of $16 \cdot 64 \cdot T_c/2^\mu$. The start timing of the random access preamble is described in [4, TS 38.211].

In case of random access response, a timing advance command [11, TS 38.321], $T_A$, for a TAG indicates $N_{TA}$ values by index values of $T_A=0, 1, 2, \ldots, 3846$, where an amount of the time alignment for the TAG with subcarrier spacing of $2^\mu \cdot 15$ kHz is $N_{TA}=T_A \cdot 16 \cdot 64/2^\mu$. $N_{TA}$ is defined in [4, TS 38.211] and is relative to the subcarrier spacing of the first uplink transmission from the UE after the reception of the random access response.

In other cases, a timing advance command [11, TS 38.321], $T_A$, for a TAG indicates adjustment of a current $N_{TA}$ value, $N_{TA\_old}$, to the new $N_{TA}$ value, $N_{TA\_new}$, by index values of $T_A$=0, 1, 2, . . . , 63, where for a subcarrier spacing of $2^\mu \cdot 15$ kHz, $N_{TA\_new} = N_{TA\_old} + (T_A - 31) \cdot 16 \cdot 64/2^\mu$.

If a UE has multiple active UL BWPs, as described in Subclause 12, in a same TAG, including UL BWPs in two UL carriers of a serving cell, the timing advance command value is relative to the largest subcarrier spacing of the multiple active UL BWPs. The applicable $N_{TA\_new}$ value for an UL BWP with lower subcarrier spacing may be rounded to align with the timing advance granularity for the UL BWP with the lower subcarrier spacing while satisfying the timing advance accuracy requirements in [10, TS38.133], Adjustment of an $N_{TA}$ value by a positive or a negative amount indicates advancing or delaying the uplink transmission timing for the TAG by a corresponding amount, respectively.

For a timing advance command received on uplink slot n, the corresponding adjustment of the uplink transmission timing applies from the beginning of uplink slot n+k+1 where $k = \lceil N_{dot}^{subframe,\mu} \cdot (N_{T,1} + N_{T,2} + N_{TA,max} + 0.5)/T_{sf} \rceil$, $N_{T,1}$ is a time duration of $N_1$ symbols corresponding to a PDSCH reception time for UE processing capability 1 when additional PDSCH DM-RS is configured, $N_{T,2}$ is a time duration of $N_2$ symbols corresponding to a PUSCH preparation time for UE processing capability 1 [6, TS 38.214], $N_{TA,max}$ is the maximum timing advance value that can be provided by a TA command field of 12 bits, $N_{slot}^{subframe,\mu}$ is a number of slots per subframe, and $T_{sf}$ is the subframe duration of 1 msec. $N_1$ and $N_2$ are determined with respect to the minimum subcarrier spacing among the subcarrier spacings of all configured UL BWPs for all uplink carriers in a TAG and of their corresponding configured DL BWPs as described in Subclause 12. Slot n and $N_{slot}^{subframe,\mu}$ are determined with respect to the minimum subcarrier spacing among the subcarrier spacings of all configured UL BWPs for all uplink carriers in the TAG. $N_{TA,max}$ is determined with respect to the minimum subcarrier spacing among the subcarrier spacings of all configured UL BWPs for all uplink carriers in the TAG and for the initial UL BWP provided by higher layer parameter initialuplinkBWP."

In the above, "TAG" refers to timing advance group, "UL" refers to uplink, "BWP" refers to bandwidth part, "PDSCH" refers to physical downlink shared channel, "DM-RS" refers to demodulation reference signal, and "PUSCH" refers to physical uplink shared channel.

The aim of TA indication is to achieve a particular maximum cell radius, irrespective of the underlying numerology. Hence, such indication uses different granularities for different SCS values. In this regard, reference is made to the portion of the excerpt that states: "For a subcarrier spacing of $2^\mu \cdot 15$ kHz, the timing advance command for a TAG indicates the change of the uplink timing relative to the current uplink timing $T_c$ for the TAG in multiples of $16 \cdot 64 \cdot T_c/2^\mu$." The timing advance command field indicates an index value of TA which is used to control an amount of timing adjustment which the medium access control MAC entity needs to apply. The size of the timing advance command field is 12 bits.

In one embodiment, while the overall number of bits for TA indication can be maintained as in Rel-15, the granularity of such indication may be reduced. For example, a value of $8.64 \cdot T_c/2$, or $4.64 \cdot T_c/2$, or other values smaller than $16 \cdot 64 \cdot T_c/2^\mu$ may be considered.

In one example, a new reduced maximum TA value is defined in the cell, and since the tight synchronization requirements are mainly addressing small geographical area (at least for factory automation use cases), the granularity of TA indication can be decreased using more bits from the overall bit-width. In other words, the maximum target cell radius is decreased to have a finer indication granularity when still using the same number of bits.

FIG. 1 includes a process 100 including, at operation 102, decoding a message from a NR Node B (gNodeB), the message corresponding to a unicast message or to a broadcast message and being received through a Universal Mobile Telecommunications System (UMTS) interface (Uu interface), the message further including reference time information; and at operation 104, determining a reference time from the reference time information, the reference time to be used by higher layers of the UE.

Figure 2:
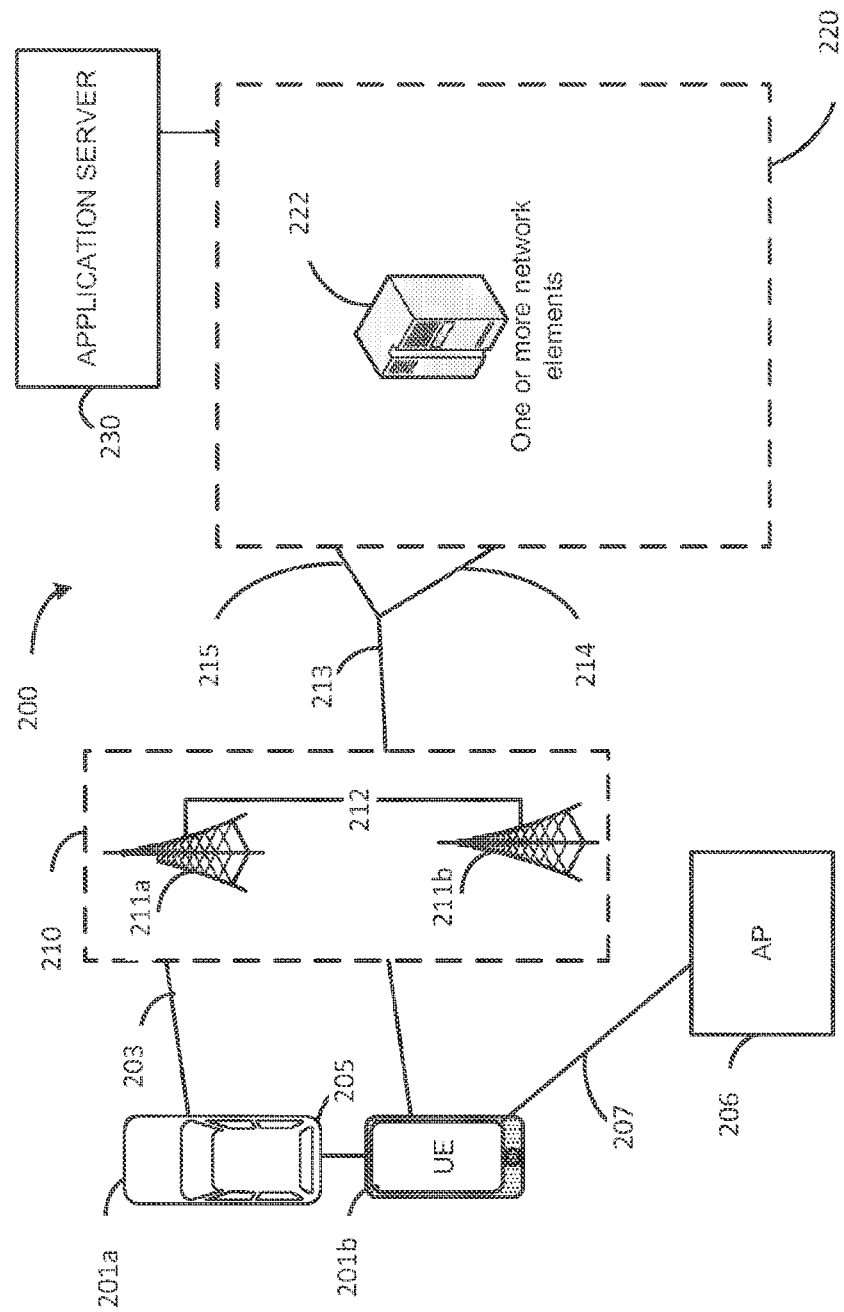
FIG. 2 illustrates an example architecture of a system of a network, in accordance with various embodiments.

FIG. 2 illustrates an example architecture of a system 200 of a network, in accordance with various embodiments. The following description is provided for an example system 200 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 2, the system 200 includes UE 201a and UE 201b (collectively referred to as "UEs 201" or "UE 201"). In this example, UEs 201 are illustrated as smartphones, but may also comprise any mobile or non-mobile computing device.

The UEs 201 may be configured to connect, for example, communicatively couple, with an or RAN 210. In embodiments, the RAN 210 may be an NG RAN or a 5G RAN, an E-UTRAN, or a legacy RAN, such as a UTRAN or GERAN. As used herein, the term "NG RAN" or the like may refer to a RAN 210 that operates in an NR or 5G system 200, and the term "E-UTRAN" or the like may refer to a RAN 210 that operates in an LTE or 4G system 200. The UEs 201 utilize connections (or channels) 203 and 204, respectively, each of which comprises a physical communications interface or layer (discussed in further detail below).

In this example, the connections 203 and 204 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 201 may directly exchange communication data via a ProSe interface 205. The ProSe interface 205 may alternatively be referred to as a SL interface 205 and may comprise one or more logical channels, including but not limited to a PSCCH, a PSSCH, a PSDCH, and a PSBCH.

The UE 201b is shown to be configured to access an AP 206 (also referred to as "WLAN node 206," "WLAN 206," "WLAN Termination 206," "WT 206" or the like) via connection 207. The connection 207 can comprise a local wireless connection, such as a connection consistent with any IEEE 802.11 protocol, wherein the AP 206 would comprise a wireless fidelity (Wi-Fi®) router. In this example, the AP 206 is shown to be connected to the Internet without connecting to the core network of the wireless system (described in further detail below).

The RAN 210 can include one or more AN nodes or RAN nodes 211a and 211b (collectively referred to as "RAN nodes 211" or "RAN node 211") that enable the connections 203 and 204. As used herein, the terms "access node," "access point," or the like may describe equipment that provides the radio baseband functions for data and/or voice connectivity between a network and one or more users. These access nodes can be referred to as BS, NR evolved NodeBs (gNodeBs), RAN nodes, eNBs, NodeBs, RSUs, TRxPs or TRPs, and so forth. As used herein, the term "NG RAN node" or the like may refer to a RAN node 211 that operates in an NR or 5G system 200 (for example, a gNB), and the term "E-UTRAN node" or the like may refer to a RAN node 211 that operates in an LTE or 4G system 200 (e.g., an eNB). According to various embodiments, the RAN nodes 211 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In embodiments, the UEs 201 can be configured to communicate using OFDM communication signals with each other or with any of the RAN nodes 211 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 211 to the UEs 201, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 201 and the RAN nodes 211, 212 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

The RAN nodes 211 may be configured to communicate with one another via interface 212. In embodiments where the system 200 is a 5G or NR system, the interface 212 may be an Xn interface 212. The Xn interface is defined between two or more RAN nodes 211 (e.g., two or more gNodeBs or gNBs and the like) that connect to 5GC 220, between a RAN node 211 (e.g., a gNB) connecting to 5GC 220 and an eNB, and/or between two eNBs connecting to 5GC 220.

The RAN 210 is shown to be communicatively coupled to a core network—in this embodiment, core network (CN) 220. The CN 220 may comprise a plurality of network elements 222, which are configured to offer various data and telecommunications services to customers/subscribers (e.g., users of UEs 201) who are connected to the CN 220 via the RAN 210. The components of the CN 220 may be implemented in one physical node or separate physical nodes including components to read and execute instructions from a machine-readable or computer-readable medium (e.g., a non-transitory machine-readable storage medium).

Generally, the application server 230 may be an element offering applications that use IP bearer resources with the core network (e.g., UMTS PS domain, LTE PS data services, etc.). The application server 230 can also be configured to support one or more communication services (e.g., VoIP sessions, PTT sessions, group communication sessions, social networking services, etc.) for the UEs 201 via the EPC 220.

In embodiments, the CN 220 may be a 5GC (referred to as "5GC 220" or the like), and the RAN 210 may be connected with the CN 220 via an NG interface 213. In embodiments, the NG interface 213 may be split into two parts, an NG user plane (NG-U) interface 214, which carries traffic data between the RAN nodes 211 and a UPF, and the S1 control plane (NG-C) interface 215, which is a signaling interface between the RAN nodes 211 and AMFs.

In embodiments, the CN 220 may be a 5G CN (referred to as "5GC 220" or the like), while in other embodiments, the CN 220 may be an EPC). Where CN 220 is an EPC (referred to as "EPC 220" or the like), the RAN 210 may be connected with the CN 220 via an S1 interface 213. In embodiments, the S1 interface 213 may be split into two parts, an S1 user plane (S1-U) interface 214, which carries traffic data between the RAN nodes 211 and the S-GW, and the S1-MME interface 215, which is a signaling interface between the RAN nodes 211 and MMEs.

Figure 3:
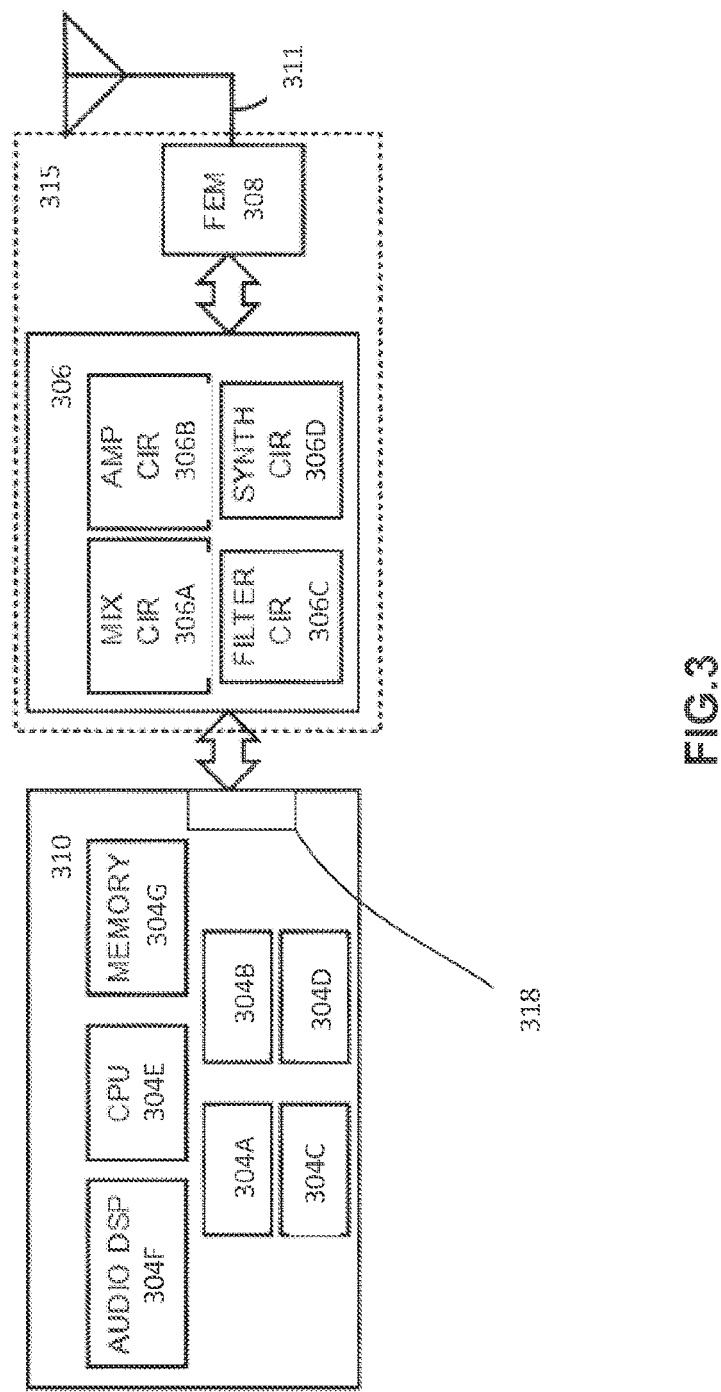
FIG. 3 illustrates example components of baseband circuitry and radio front end modules (RFEM) in accordance with various embodiments.

FIG. 3 illustrates example components of baseband circuitry 310 and radio front end modules (RFEM) 315 in accordance with various embodiments. Baseband circuitry 310 includes a RF interface 318 connecting it to the RFEM. As shown, the RFEMs 315 may include Radio Frequency (RF) circuitry 306, front-end module (FEM) circuitry 308, antenna array 311 coupled together at least as shown.

The baseband circuitry 310 includes circuitry and/or control logic configured to carry out various radio/network protocol and radio control functions that enable communication with one or more radio networks via the RF circuitry 306. The radio control functions may include, but are not limited to, signal modulation/demodulation, encoding/decoding, radio frequency shifting, etc. In some embodiments, modulation/demodulation circuitry of the baseband circuitry 310 may include Fast-Fourier Transform (FFT), precoding, or constellation mapping/demapping functionality. In some embodiments, encoding/decoding circuitry of the baseband circuitry 310 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 310 is configured to process baseband signals received from a receive signal path of the RF circuitry 306 and to generate baseband signals for a transmit signal path of the RF circuitry 306. The baseband circuitry 310 is configured to interface with an application circuitry for generation and processing of the baseband signals and for controlling operations of the RF circuitry 306. The baseband circuitry 310 may handle various radio control functions.

The aforementioned circuitry and/or control logic of the baseband circuitry 310 may include one or more single or multi-core processors. For example, the one or more processors may include a 3G baseband processor 304A, a 4G/LTE baseband processor 304B, a 5G/NR baseband processor 304C, or some other baseband processor(s) 304D for other existing generations, generations in development or to be developed in the future (e.g., sixth generation (6G), etc.). In other embodiments, some or all of the functionality of baseband processors 304A-D may be included in modules stored in the memory 304G and executed via a Central Processing Unit (CPU) 304E. In other embodiments, some or all of the functionality of baseband processors 304A-D may be provided as hardware accelerators (e.g., FPGAs, ASICs, etc.) loaded with the appropriate bit streams or logic blocks stored in respective memory cells. In various embodiments, the memory 304G may store program code of a real-time OS (RTOS), which when executed by the CPU 304E (or other baseband processor), is to cause the CPU 304E (or other baseband processor) to manage resources of the baseband circuitry 310, schedule tasks, etc. In addition, the baseband circuitry 310 includes one or more audio digital signal processor(s) (DSP) 304F. The audio DSP(s) 304F include elements for compression/decompression and echo cancellation and may include other suitable processing elements in other embodiments.

In some embodiments, each of the processors 304A-304E include respective memory interfaces to send/receive data to/from the memory 304G. The baseband circuitry 310 may further include one or more interfaces to communicatively couple to other circuitries/devices RF circuitry 306 may enable communication with wireless networks using modulated electromagnetic radiation through a non-solid medium.

In some embodiments, the receive signal path of the RF circuitry 306 may include mixer circuitry 306a, amplifier circuitry 306b and filter circuitry 306c. In some embodiments, the transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 310 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

FEM circuitry 308 may include a receive signal path, which may include circuitry configured to operate on RF signals received from antenna array 311, amplify the received signals and provide the amplified versions of the received signals to the RF circuitry 306 for further processing. FEM circuitry 308 may also include a transmit signal path, which may include circuitry configured to amplify signals for transmission provided by the RF circuitry 306 for transmission by one or more of antenna elements of antenna array 311. In various embodiments, the amplification through the transmit or receive signal paths may be done solely in the RF circuitry 306, solely in the FEM circuitry 308, or in both the RF circuitry 306 and the FEM circuitry 308.

The antenna array 311 comprises one or more antenna elements, each of which is configured convert electrical signals into radio waves to travel through the air and to convert received radio waves into electrical signals. For example, digital baseband signals provided by the baseband circuitry 310 is converted into analog RF signals (e.g., modulated waveform) that will be amplified and transmitted via the antenna elements of the antenna array 311 including one or more antenna elements (not shown). The antenna elements may be omnidirectional, direction, or a combination thereof. The antenna elements may be formed in a multitude of arranges as are known and/or discussed herein. The antenna array 311 may comprise microstrip antennas or printed antennas that are fabricated on the surface of one or more printed circuit boards. The antenna array 311 may be formed in as a patch of metal foil (e.g., a patch antenna) in a variety of shapes, and may be coupled with the RF circuitry 306 and/or FEM circuitry 308 using metal transmission lines or the like.

One or more of the components of FIGS. 2 and/or 3, may be used in any of the embodiments described herein.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The components of FIGS. 2 and/or 3, such as the shown baseband processing circuitry including processing circuitry and a RF interface, may be used in any of the embodiments described herein, such as in a gNodeB or in a UE.

In some embodiments, the electronic device(s), network(s), system(s), chip(s) or component(s), or portions or implementations thereof, of FIGS. 2 and/or 3, or some other figure herein, may be configured to perform one or more processes, techniques, or methods as described herein, or portions thereof.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

In some embodiments, the electronic device(s), network(s), system(s), chip(s) or component(s), or portions or implementations thereof, of FIGS. 2 and/or 3, or some other figure herein, may be configured to perform one or more processes, techniques, or methods as described herein, or portions thereof.

In some embodiments, the electronic device of FIGS. 2 and/or 3 may be configured to perform one or more processes, techniques, and/or methods as described herein, or portions thereof.

EXAMPLES

Example 1 includes a device of a New Radio (NR) User Equipment (UE), the device including a radio frequency (RF) interface, and a processing circuitry coupled to the RF interface, the processing circuitry to: decode a message from a NR Node B (gNodeB), the message corresponding to a unicast message or to a broadcast message and being received through a Universal Mobile Telecommunications System (UMTS) interface (Uu interface), the message further including reference time information; and determine a reference time from the reference time information, the reference time to be used by higher layers of the UE.

Example 2 includes the subject matter of Example 1, and optionally, wherein: the unicast message indicates one of explicitly via a higher layer parameter, or implicitly via a predefined association, that the reference time information concerns pre-compensated reference time information corresponding to a pre-compensated reference time that has been pre-compensated for propagation delay between a receiver of the UE and a transmitter of the gNodeB; and wherein the processing circuitry is, in response to a determination that the reference time is a pre-compensated reference time, determine the reference time without applying any compensation for propagation delay thereto.

Example 3 includes the subject matter of Example 2, and optionally, wherein: the unicast message does not include an indication of a range of inaccuracy associated in the pre-compensation reference time information; and the processing circuitry is, in response to a determination that the reference time is a pre-compensated reference time, determine the reference time without using any range of inaccuracy associated with the pre-compensation reference time.

Example 4 includes the subject matter of Example 1, and optionally, wherein: the reference time information is a unicast reference time information, and the message is a unicast message; and the processing circuitry is to: decode a broadcast message including a broadcast reference time information; overwrite the broadcast reference time information with the unicast reference time information based on at least one of a higher priority of the unicast reference time information, an accuracy of the reference time, or a granularity of the reference time; and determine the reference time based only on the unicast reference time information.

Example 5 includes the subject matter of Example 1, and optionally, wherein: the reference time information is a unicast reference time information, and the message is a unicast message; and the processing circuitry is to: decode, before decoding the unicast message, a broadcast message including a broadcast reference time information; and in response to a determination that the UE is configured with a cell radio network temporary identifier (C-RNTI), expect the unicast message after decoding the broadcast message.

Example 6 includes the subject matter of Example 1, and optionally, wherein: the reference time information is a broadcast reference time information, and the message is a broadcast message; and the processing circuitry is to: expect a unicast message including a unicast reference time information within a time window after receipt of the broadcast message by the UE, wherein the time window is dynamically or semi-statically configured to the UE; and determine the reference time based only on the broadcast reference time information in response to a determination that the unicast message was not received by the UE within the time window.

Example 7 includes the subject matter of Example 1, and optionally, the processing circuitry to further decode a compensation offset signal from the gNodeB, the signal including a field indicating a compensation offset for the reference time, the signal further being based on an estimated DL propagation delay specific to the UE and being separate from the message.

Example 8 includes the subject matter of Example 1, and optionally, wherein the reference time indication includes an indication of at least one of an accuracy and of a granularity associated with the reference time, the processing circuitry to further: decode a downlink (DL) propagation delay compensation signal from the gNodeB; and determine, based on the DL propagation delay compensation signal, whether to perform a DL propagation delay compensation in determining the reference time.

Example 9 includes the subject matter of Example 8, and optionally, wherein, in response to a determination that the DL propagation delay compensation signal indicates to the processing circuitry to perform the DL propagation delay compensation, the processing circuitry is to perform the DL propagation delay compensation using timing advance (TA) information.

Example 10 includes the subject matter of Example 1, and optionally, the processing circuitry to further decode a timing advance (TA) command field from the gNodeB, the TA command field having a bit-width of 12 bits, and including TA information with a granularity having a value of wherein $K \cdot 64 \cdot T_c/2^\mu$, is less than 16, and wherein $T_c$ corresponds to a basic time unit for NR.

Example 11 includes the subject matter of Example 10, and optionally, wherein the TA information includes a reduced maximum TA value that is less than $3846 \cdot 16 \cdot 64/2^\mu$, the reduced maximum TA value using an increased number of bits of the bit-width.

Example 12 includes the subject matter of Example 1, and optionally, the processing circuitry is to: prioritize a unicast signaling technique over a broadcast signaling technique; decode a first reference time information in a system information block (SIB) message sent by the gNodeB via the broadcast signaling technique; determine whether a second reference time information is received by the UE within a time window, the second reference time information sent by the gNodeB via the unicast signaling technique; overwrite the first reference time information with the second reference time information in response to a determination that the second reference time information was received by the UE within the time window; and refrain from overwriting the first reference time information with the second reference time information in response to a determination that the second reference time information was not received by the UE within the time window.

Example 13 includes the subject matter of any one of Examples 1-12, and optionally, wherein the unicast message includes dedicated radio resource control signaling, and the broadcast message includes system information block (SIB) signaling.

Example 14 includes the subject matter of any one of Examples 1-13, and optionally, further including a front-end module coupled to the RF interface.

Example 15 includes the subject matter of Example 14, and optionally, further including one or more antennas coupled to the front-end module to transmit and receive communications via the UU interface.

Example 16 includes a method to be performed at a device of a New Radio (NR) User Equipment (UE), the method including: decoding a message from a NR Node B (gNodeB), the message corresponding to a unicast message or to a broadcast message and being received through a Universal Mobile Telecommunications System (UMTS) interface (Uu interface), the message further including reference time information; and determining a reference time from the reference time information, the reference time to be used by higher layers of the UE.

Example 17 includes the subject matter of Example 16, and optionally, wherein: the unicast message indicates one of explicitly via a higher layer parameter, or implicitly via a predefined association, that the reference time information concerns pre-compensated reference time information corresponding to a pre-compensated reference time that has been pre-compensated for propagation delay between a receiver of the UE and a transmitter of the gNodeB; and the method includes, in response to a determination that the reference time is a pre-compensated reference time, determining the reference time without applying any compensation for propagation delay thereto.

Example 18 includes the subject matter of Example 17, and optionally, wherein: the unicast message does not include an indication of a range of inaccuracy associated in the pre-compensation reference time information; and the method includes, in response to a determination that the reference time is a pre-compensated reference time, determining the reference time without using any range of inaccuracy associated with the pre-compensation reference time.

Example 19 includes the subject matter of Example 16, and optionally, wherein: the reference time information is a unicast reference time information, and the message is a unicast message; and the method includes: decoding a broadcast message including a broadcast reference time information; overwriting the broadcast reference time information with the unicast reference time information based on at least one of a higher priority of the unicast reference time information, an accuracy of the reference time, or a granularity of the reference time; and determining the reference time based only on the unicast reference time information.

Example 20 includes the subject matter of Example 16, and optionally, wherein: the reference time information is a unicast reference time information, and the message is a unicast message; and the method includes: decoding, before decoding the unicast message, a broadcast message including a broadcast reference time information; and in response to a determination that the UE is configured with a cell radio network temporary identifier (C-RNTI), expecting the unicast message after decoding the broadcast message.

Example 21 includes the subject matter of Example 16, and optionally, wherein: the reference time information is a broadcast reference time information, and the message is a broadcast message; and the method includes: expecting a unicast message including a unicast reference time information within a time window after receipt of the broadcast message by the UE, wherein the time window is dynamically or semi-statically configured to the UE; and determining the reference time based only on the broadcast reference time information in response to a determination that the unicast message was not received by the UE within the time window.

Example 22 includes the subject matter of Example 16, and optionally, further including decoding a compensation offset signal from the gNodeB, the signal including a field indicating a compensation offset for the reference time, the signal further being based on an estimated DL propagation delay specific to the UE and being separate from the message.

Example 23 includes the subject matter of Example 16, and optionally, wherein the reference time indication includes an indication of at least one of an accuracy and of a granularity associated with the reference time, the method including: decoding a downlink (DL) propagation delay compensation signal from the gNodeB; and determining, based on the DL propagation delay compensation signal, whether to perform a DL propagation delay compensation in determining the reference time.

Example 24 includes the subject matter of Example 23, and optionally, further including, in response to a determination that the DL propagation delay compensation signal indicates to the processing circuitry to perform the DL propagation delay compensation, performing the DL propagation delay compensation using timing advance (TA) information.

Example 25 includes the subject matter of Example 16, and optionally, further including decoding a timing advance (TA) command field from the gNodeB, the TA command field having a bit-width of 12 bits, and including TA information with a granularity having a value of $K \cdot 64 \cdot T_c/2^\mu$, wherein K is less than 16, and wherein $T_c$ corresponds to a basic time unit for NR.

Example 26 includes the subject matter of Example 25, and optionally, wherein the TA information includes a reduced maximum TA value that is less than $3846 \cdot 16 \cdot 64/2^\mu$, the reduced maximum TA value using an increased number of bits of the bit-width.

Example 27 includes the subject matter of Example 16, and optionally, further including: prioritizing a unicast signaling technique over a broadcast signaling technique; decoding a first reference time information in a system information block (SIB) message sent by the gNodeB via the broadcast signaling technique; determining whether a second reference time information is received by the UE within a time window, the second reference time information sent by the gNodeB via the unicast signaling technique; overwriting the first reference time information with the second reference time information in response to a determination that the second reference time information was received by the UE within the time window; and refraining from overwriting the first reference time information with the second reference time information in response to a determination that the second reference time information was not received by the UE within the time window.

Example 28 includes the method of any one of Examples 16-27, and optionally, wherein the unicast message includes dedicated radio resource control signaling, and the broadcast message includes system information block (SIB) signaling.

Example 29 includes device of a New Radio (NR) User Equipment (UE), the device including: means for decoding a message from a NR Node B (gNodeB), the message corresponding to a unicast message or to a broadcast message and being received through a Universal Mobile Telecommunications System (UMTS) interface (Uu interface), the message further including reference time information; and means for determining a reference time from the reference time information, the reference time to be used by higher layers of the UE.

Example 30 includes the subject matter of Example 16, and optionally, wherein: the unicast message indicates one of explicitly via a higher layer parameter, or implicitly via a predefined association, that the reference time information concerns pre-compensated reference time information corresponding to a pre-compensated reference time that has been pre-compensated for propagation delay between a receiver of the UE and a transmitter of the gNodeB; and the device includes means for, in response to a determination that the reference time is a pre-compensated reference time, determining the reference time without applying any compensation for propagation delay thereto.

Example 31 includes a machine-readable medium including code which, when executed, is to cause a machine to perform the method of any one of Examples 16-28.

Example 32 includes a device of a New Radio (NR) evolved Node B (gNodeB), the device including a radio frequency (RF) interface, and a processing circuitry coupled to the RF interface, the processing circuitry to: encode a message corresponding to a unicast message or to a broadcast message and for transmission through a Universal Mobile Telecommunications System (UMTS) interface (Uu interface), the message including reference time information; and cause transmission of the message to a NR User Equipment (UE) to allow the UE to determine a reference time from the reference time information, the reference time to be used by higher layers of the UE.

Example 33 includes the subject matter of Example 32, and optionally, wherein the unicast message indicates one of explicitly via a higher layer parameter, or implicitly via a predefined association, that the reference time information concerns pre-compensated reference time information corresponding to a pre-compensated reference time that has been pre-compensated for propagation delay between a receiver of the UE and a transmitter of the gNodeB.

Example 34 includes the subject matter of Example 33, and optionally, wherein the unicast message does not include an indication of a range of inaccuracy associated in the pre-compensation reference time information.

Example 35 includes the subject matter of Example 32, and optionally, the processing circuitry to further encode a compensation offset signal to the UE, the signal including a field indicating a compensation offset for the reference time, the signal further being based on an estimated DL propagation delay specific to the UE and being separate from the message.

Example 36 includes the subject matter of Example 32, and optionally, wherein the reference time indication includes an indication of at least one of an accuracy and of a granularity associated with the reference time, the processing circuitry to further encode a downlink (DL) propagation delay compensation signal from the gNodeB, the DL propagation delay compensation signal to allow the UE to determine whether to perform a DL propagation delay compensation in determining the reference time, and to cause transmission to the DL propagation delay compensation signal to the UE.

Example 37 includes the subject matter of Example 32, and optionally, the processing circuitry to further encode a timing advance (TA) command field to the UE, the TA command field having a bit-width of 12 bits, and including TA information with a granularity having a value of $K \cdot 64 \cdot T_c / 2^\mu$, wherein K is less than 16, and wherein $T_c$ corresponds to a basic time unit for NR.

Example 38 includes the subject matter of Example 37, and optionally, wherein the TA information includes a reduced maximum TA value that is less than $3846 \cdot 16 \cdot 64/2^\mu$, the reduced maximum TA value using an increased number of bits of the bit-width.

Example 39 includes the subject matter of any one of Examples 32-38, and optionally, wherein the unicast message includes dedicated radio resource control signaling, and the broadcast message includes system information block (SIB) signaling.

Example 40 includes the subject matter of any one of Examples 32-39, and optionally, further including a front-end module coupled to the RF interface.

Example 41 includes the subject matter of Example 40, and optionally, further including one or more antennas coupled to the front-end module to transmit and receive communications via the Uu interface.

Example 42 includes a product comprising one or more tangible computer-readable non-transitory storage media comprising computer-executable instructions operable to, when executed by at least one computer processor, enable the at least one computer processor to perform the method of any one of the Examples herein, or of a method as shown or described herein.

Example 43 includes an apparatus comprising means for causing a wireless communication device to perform the method of any one of the Examples herein, or of a method as shown or described herein.

Example 44 includes an apparatus for using a synchronizing system information block (SIB), the apparatus comprising means for performing a method of any one of the Examples herein, or of a method as shown or described herein.

Example 45 includes an apparatus for using in synchronizing system information block (SIB), the apparatus comprising circuitry configured to perform a method of any one of the Examples herein, or of a method as shown or described herein.

Example 46 includes one or more non-transitory computer-readable media comprising instructions to cause an electronic device, upon execution of the instructions by one or more processors of the electronic device, to perform one or more elements of a method described in or related to any one of the Examples herein, or of a method as shown or described herein.

Example 47 includes an apparatus comprising logic, modules, or circuitry to perform one or more elements of a method described in or related to any one of the Examples herein, or of a method as shown or described herein.

Example 48 includes a signal as described in or related to any of the Examples above, or portions or parts thereof.

Example 49 includes a signal in a wireless network as shown and described herein.

Example 50 includes a method of communicating in a wireless network as shown and described herein.

Example 51 includes a system for providing wireless communication as shown and described herein.

Example 52 includes a device for providing wireless communication as shown and described herein.

Example 53 includes an apparatus, method, or machine-readable media according to any of any one of the relevant Examples or descriptions above, wherein the apparatus, method, or machine-readable media or any portion thereof is implemented in or by a user equipment (UE).

Example 54 includes an apparatus, method, or machine-readable media according to any of any one of the relevant Examples or descriptions above, wherein the apparatus, method, or machine-readable media or any portion thereof is implemented in by a base station (BS) or gNodeB.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A baseband processor for a User Equipment (UE), configured to:
   decode a unicast message from a base station received through a radio interface, the unicast message including reference time information and an indication that the reference time information corresponds to a pre-compensated reference time that has been pre-compensated, prior to reception of the unicast message from the base station, for propagation delay between a receiver of the UE and a transmitter of the base station;
   in response to the indication, determine a reference time from the reference time information without applying compensation for propagation delay thereto; and
   cause the UE to communicate with the base station based on the reference time.

2. The baseband processor of claim 1, further configured to:
   in response to the unicast message not including an indication of a range of inaccuracy in the pre-compensated reference time determine the reference time without using any range of inaccuracy associated with the pre-compensated reference time.

3. The baseband processor of claim 1, wherein the baseband processor is configured to further decode a compensation offset signal from the base station, the signal including a field indicating a compensation offset for the reference time, the signal further being based on an estimated DL propagation delay specific to the UE and being separate from the unicast message.

4. The baseband processor of claim 1, wherein the reference time information includes an indication of at least one of an accuracy and of a granularity associated with the reference time, wherein the baseband processor is configured to further:
   decode a downlink (DL) propagation delay compensation signal from the base station; and determine, based on the DL propagation delay compensation signal, whether to perform a DL propagation delay compensation in determining the reference time.

5. The baseband processor of claim 4, wherein, in response to a determination that the DL propagation delay compensation signal indicates to perform the DL propagation delay compensation, the baseband processor is configured to perform the DL propagation delay compensation using timing advance (TA) information.

6. The baseband processor of claim 1, wherein the baseband processor is configured to further decode a timing advance (TA) command field from the base station, the TA command field having a bit-width of 12 bits, and including TA information with a granularity having a value of $K \cdot 64 \cdot T_0 / 2^m$, wherein K is less than 16, and wherein $T_c$ corresponds to a basic time unit for NR.

7. The baseband processor of claim 6, wherein the TA information includes a reduced maximum TA value that is less than $3846 \cdot 16 \cdot 64/2^m$, the reduced maximum TA value using an increased number of bits of the bit-width.

8. The baseband processor of claim 1, wherein the baseband processor is configured to:
   prioritize a unicast signaling technique over a broadcast signaling technique;
   decode a first reference time information in a system information block (SIB) message sent by the base station via the broadcast signaling technique;
   determine whether a second reference time information is received by the UE within a time window, the second reference time information sent by the base station via the unicast signaling technique;
   prioritize the second reference time information in response to a determination that the second reference time information was received by the UE within the time window; and
   refrain from prioritizing the second reference time information in response to a determination that the second reference time information was not received by the UE within the time window.

9. The baseband processor of claim 1, wherein the unicast message includes dedicated radio resource control signaling.

10. A method for a User Equipment (UE), comprising:
    receiving a unicast message from a base station, the unicast message including reference time information and an indication that the reference time information corresponds to a pre-compensated reference time that has been pre-compensated, prior to reception of the unicast message from the base station, for propagation delay between a receiver of the UE and a transmitter of the base station;
    in response to the indication, determining a reference time from the reference time information without applying compensation for propagation delay thereto; and
    causing the UE to communicate with the base station based on the reference time.

11. The method of claim 10, further comprising:
    in response to the unicast message not including an indication of a range of inaccuracy in the pre-compensated reference time, determining the reference time without using any range of inaccuracy associated with the pre-compensated reference time.

12. The method of claim 10, further comprising:
    receiving a compensation offset signal from the base station, the signal including a field indicating a compensation offset for the reference time, the signal further being based on an estimated DL propagation delay specific to the UE and being separate from the unicast message.

13. The method of claim 10, wherein the reference time information includes an indication of at least one of an accuracy and of a granularity associated with the reference time, the method further comprising:
    receiving a downlink (DL) propagation delay compensation signal from the base station; and determining, based on the DL propagation delay compensation signal, whether to perform a DL propagation delay compensation in determining the reference time.

14. The method of claim 13, further comprising:
in response to a determination that the DL propagation delay compensation signal indicates to perform the DL propagation delay compensation, performing the DL propagation delay compensation using timing advance (TA) information.

15. The method of claim 10, further comprising:
receiving a timing advance (TA) command field from the base station, the TA command field having a bit-width of 12 bits, and including TA information with a granularity having a value of $K \cdot 64 \cdot T_0/2^m$, wherein K is less than 16, and wherein $T_c$ corresponds to a basic time unit for NR.

16. A User Equipment (UE), comprising:
a memory;
radio front end circuitry; and
processor circuitry coupled to the radio front end circuitry and coupled to the memory, wherein the processor circuitry is configured to execute instructions stored in the memory to cause the UE to:
receive, via the radio front end circuitry, a unicast message from a base station, the unicast message including reference time information and an indication that the reference time information corresponds to a pre-compensated reference time that has been pre-compensated, prior to reception of the unicast message from the base station, for propagation delay between a receiver of the UE and a transmitter of the base station;
in response to the indication, determine a reference time from the reference time information without applying compensation for propagation delay thereto; and
communicate with the base station based on the reference time.

17. The UE of claim 16, wherein the processor circuitry is further configured to cause the UE to:
receive a timing advance (TA) command field from the base station, the TA command field having a bit-width of 12 bits, and including TA information with a granularity having a value of $K \cdot 64 \cdot T_0/2^m$, wherein K is less than 16, and wherein $T_c$ corresponds to a basic time unit for NR.

18. The UE of claim 17, wherein the TA information includes a reduced maximum TA value that is less than $3846 \cdot 16 \cdot 64/2^m$, the reduced maximum TA value using an increased number of bits of the bit-width.

19. The UE of claim 16, wherein the processor circuitry is further configured to cause the UE to:
prioritize a unicast signaling technique over a broadcast signaling technique;
receive a first reference time information in a system information block (SIB) message sent by the base station via the broadcast signaling technique;
determine whether a second reference time information is received by the UE within a time window, the second reference time information sent by the base station via the unicast signaling technique;
prioritize the second reference time information in response to a determination that the second reference time information was received by the UE within the time window; and
refrain from prioritizing the second reference time information in response to a determination that the second reference time information was not received by the UE within the time window.

20. The UE of claim 16, wherein the unicast message includes dedicated radio resource control signaling.

* * * * *